United States Patent
Napier et al.

(10) Patent No.: US 8,739,324 B2
(45) Date of Patent: Jun. 3, 2014

(54) SHOWER ROD MOUNTING BRACKET

(75) Inventors: Rodney L. Napier, Canton, OH (US);
David Brokaw, North Canton, OH (US)

(73) Assignee: Universal Commerce, LLC, North Canton, OH (US)

( * ) Notice: Subject to any disclaimer, the term of this patent is extended or adjusted under 35 U.S.C. 154(b) by 532 days.

(21) Appl. No.: 12/980,408

(22) Filed: Dec. 29, 2010

(65) Prior Publication Data
US 2012/0167368 A1    Jul. 5, 2012

(51) Int. Cl.
*A47K 3/00*    (2006.01)

(52) U.S. Cl.
USPC .............. 4/610; 4/596; 4/607; 29/455.1

(58) Field of Classification Search
USPC .............. 4/557, 610, 596, 607; 29/455.1
See application file for complete search history.

(56) References Cited

U.S. PATENT DOCUMENTS

| | | | |
|---|---|---|---|
| 6,216,287 B1 * | 4/2001 | Wise ................................ | 4/610 |
| D543,839 S * | 6/2007 | Cooper et al. ................. | D8/376 |
| D586,647 S * | 2/2009 | Didehvar ...................... | D8/376 |
| 7,512,997 B2 * | 4/2009 | Dewees ......................... | 4/610 |
| 8,214,938 B2 * | 7/2012 | Hanley et al. .................... | 4/610 |
| 8,341,775 B2 * | 1/2013 | Didehvar ........................ | 4/608 |
| D681,422 S * | 5/2013 | Lindo et al. ................... | D8/376 |
| 2005/0268394 A1 * | 12/2005 | Monk et al. ...................... | 4/558 |
| 2008/0078018 A1 * | 4/2008 | Hanley et al. .................... | 4/558 |
| 2012/0036628 A1 * | 2/2012 | O'Connell ....................... | 4/610 |

* cited by examiner

*Primary Examiner* — Carl Arbes
(74) *Attorney, Agent, or Firm* — Sand & Sebolt

(57) ABSTRACT

A bracket for mounting a curved shower rod on a previously installed straight shower rod. The bracket includes a body having a first member that defines a first bore for receiving an end of the curved shower rod therein, and a second member defining a second bore for receiving a portion of the straight shower rod therein. The first member extends outwardly from the second member at an angle. The second member comprises first and second regions that are movable away from each other to capture a portion of the straight shower rod between them. A securement mechanism locks the first and second regions together to prevent the bracket from disengaging from the straight shower rod. A second mounting bracket is similarly engaged on an opposite end of the straight shower rod and receives a second end of the curved shower rod therein.

16 Claims, 7 Drawing Sheets

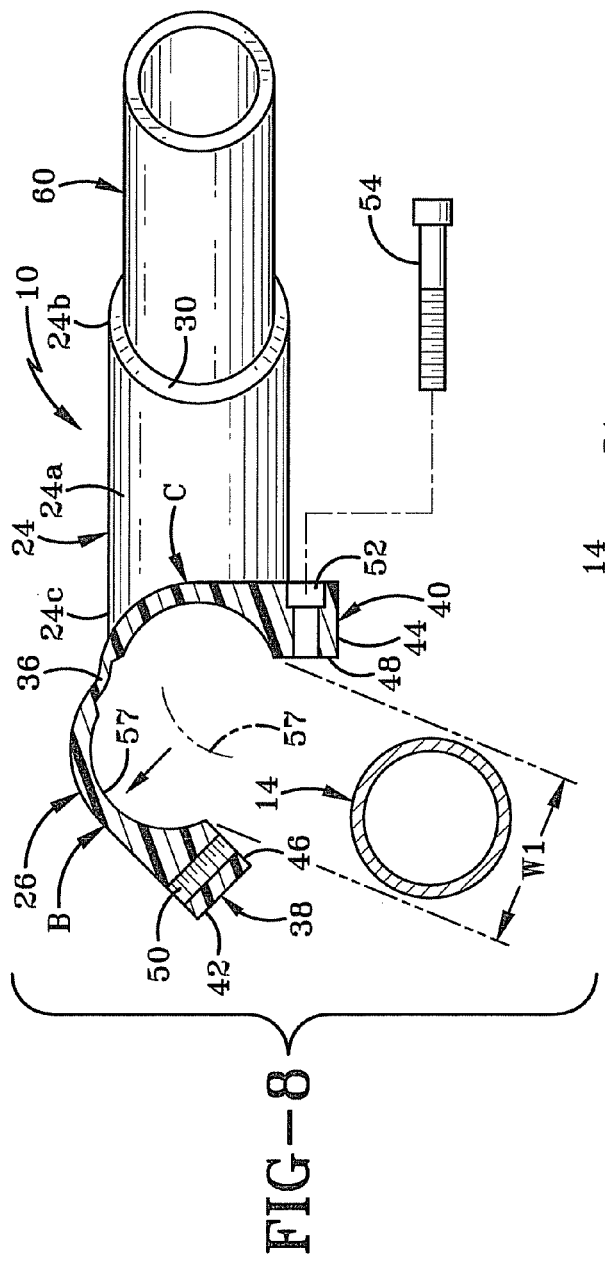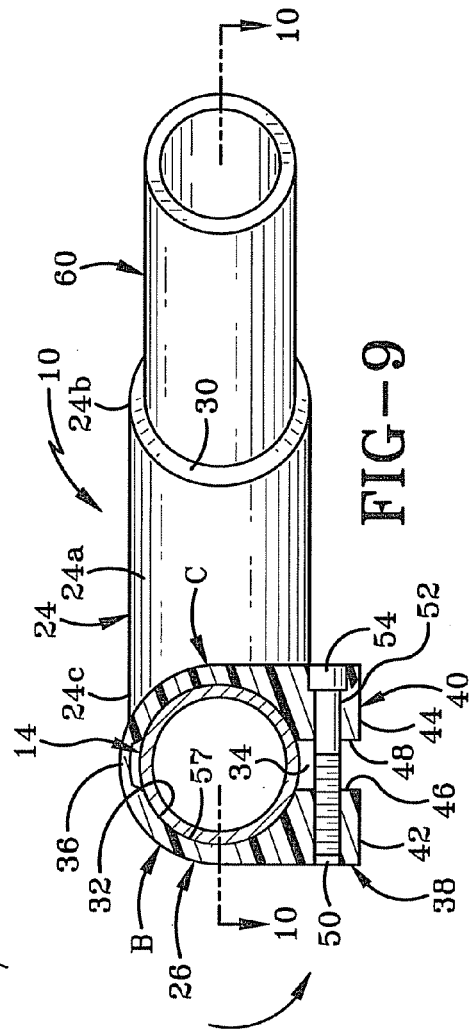

SHOWER ROD MOUNTING BRACKET

BACKGROUND OF THE INVENTION

1. Technical Field

This invention generally relates to bath fixtures. More particularly, the invention relates to shower rods. Specifically, the invention relates to a mounting bracket that is engageable with a previously installed straight shower rod and is configured to retain an end of a curved shower rod therein.

2. Background Information

Shower curtains are supported by shower rods that extend between opposing side walls of a bathtub enclosure. For many years, the typical shower rod has taken the form of an elongated tubular member that is substantially straight. Recently, however, it has become fashionable to use a curved shower rod. The curved rods tend to let more light into the bathtub enclosure, makes the bathroom more aesthetically appealing, and allows more room in the shower.

If a homeowner wishes to change the appearance of the bathroom by including a curved shower rod, they can simply remove the straight shower rod and install a curved rod. This operation can be problematic because the type of bracket used to install straight shower rods are not generally suitable for installing curved rods. The homeowner may well have to drill new holes for installing fasteners for the curved rod bracket. If the bathtub enclosure is tiled, repairing the old holes is extremely problematic and unsightly. If the job is not done correctly, there is the risk that moisture could enter through the old bracket holes and lead to the tiles separating from the backer board. If the bathtub enclosure is a prefabricated vinyl material then, once again, making a new set of screw holes creates problems down the road. Additionally, if the homeowner is renting his home, the landlord could object to or prohibit the homeowner from making this type of renovation.

There is therefore a need in the art for a quick and simple way of mounting a curved shower rod in a bathtub enclosure.

SUMMARY OF THE INVENTION

The device of the present invention comprises a bracket for mounting a curved shower rod on a previously installed straight shower rod. The bracket includes a body having a first member that defines a first bore for receiving an end of the curved shower rod therein, and a second member defining a second bore for receiving a portion of the straight shower rod therein. The first member extends outwardly from the second member at an angle. The second member comprises first and second regions that are movable away from each other to capture a portion of the straight shower rod between them. A securement mechanism locks the first and second regions together to prevent the bracket from disengaging from the straight shower rod. A second mounting bracket is similarly engaged on an opposite end of the straight shower rod and receives a second end of the curved shower rod therein.

BRIEF DESCRIPTION OF THE DRAWINGS

The preferred embodiments of the invention, illustrative of the best mode in which applicant has contemplated applying the principles, are set forth in the following description and are shown in the drawings and are particularly and distinctly pointed out and set forth in the appended claims.

FIG. 8 is a partial cross-sectional front view of the mounting bracket with an end of a curved rod engaged in a first member thereof, and with a second member thereof in an opened position ready to be engaged with a portion of a straight shower rod;

FIG. 9 is a partial cross-sectional front view of the mounting bracket engaged with the ends of each of the straight and curved shower rods.

DETAILED DESCRIPTION OF THE INVENTION

Figure 1:
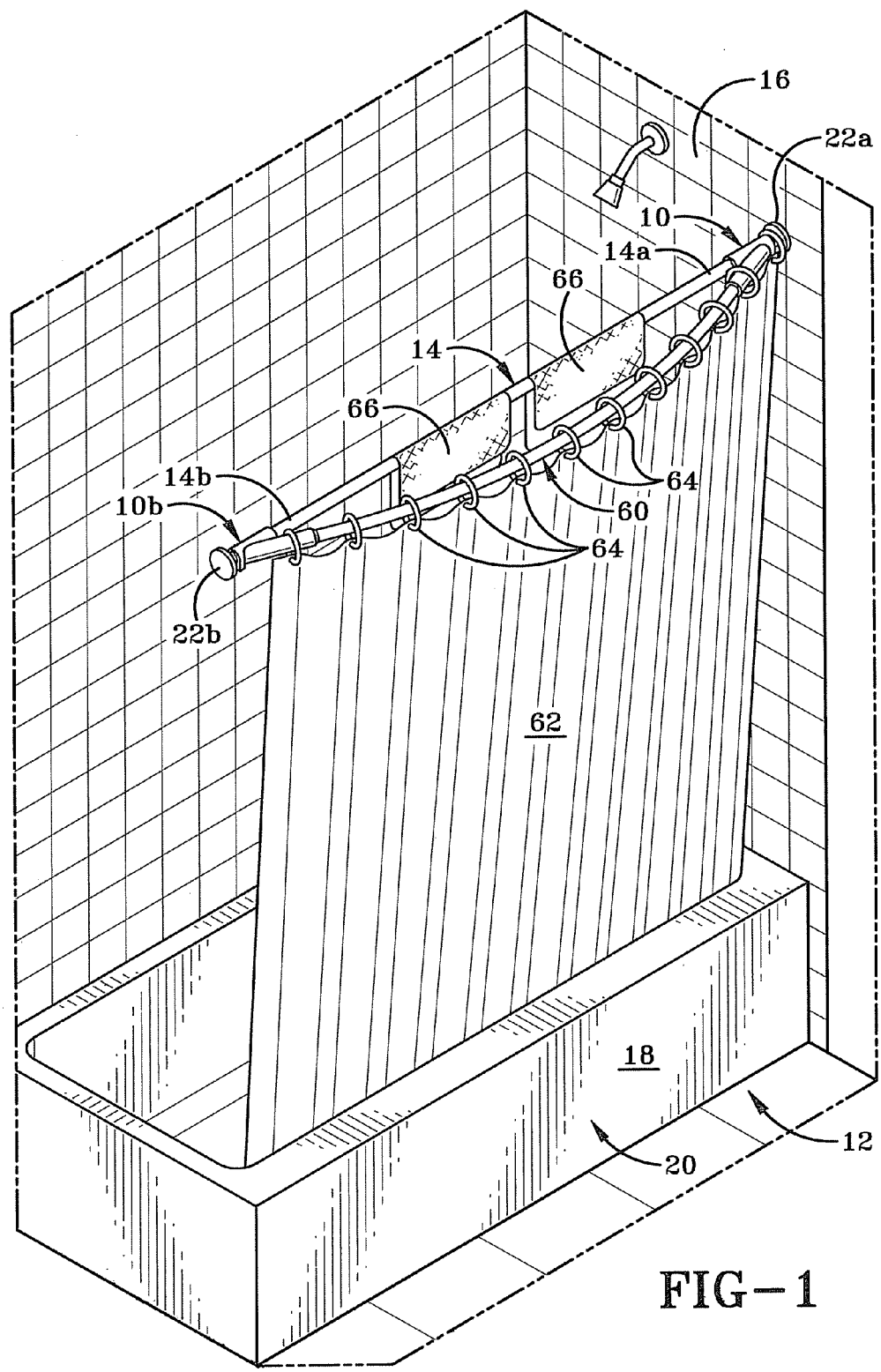
FIG. 1 is a perspective view of a bathtub enclosure with one side wall removed for clarity and showing the shower rod mounting bracket in accordance with the present invention.
Figure 2:
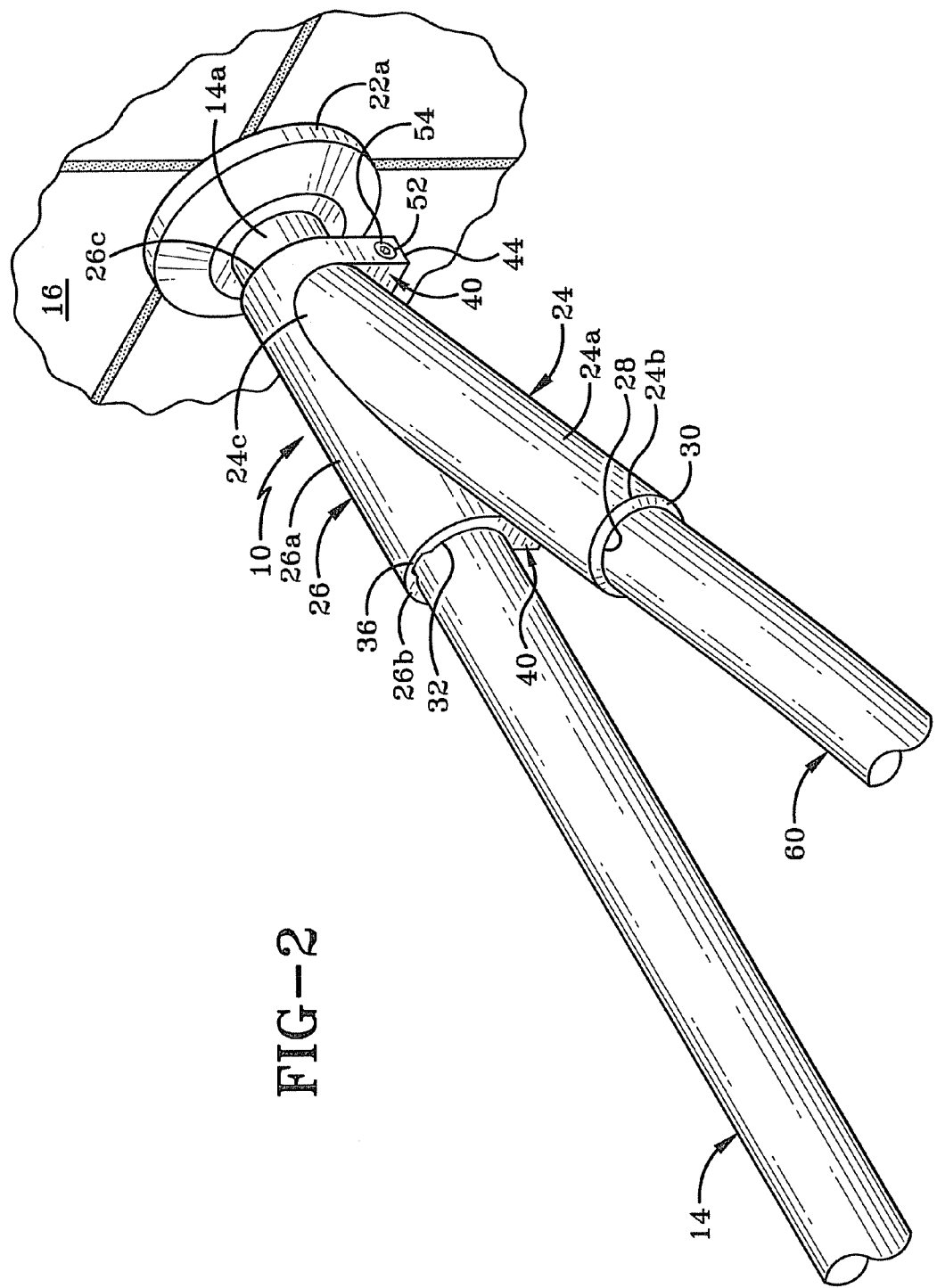
FIG. 2 is a perspective view of the mounting bracket in accordance with the present invention and showing an end of each of a straight shower rod and a curved shower rod engaged therewith.
Figure 10:
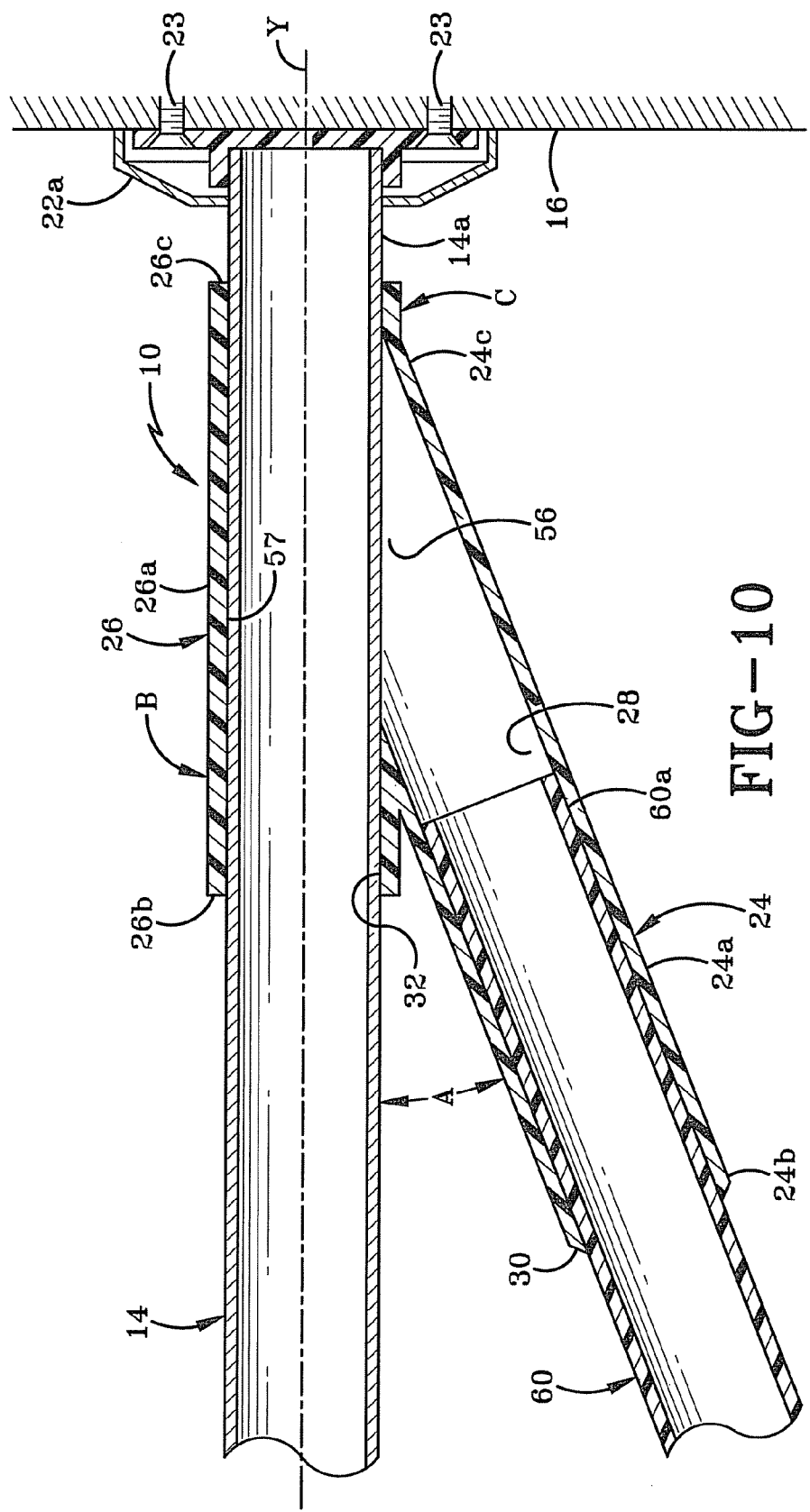
FIG. 10 is a cross-sectional top view of the mounting bracket and ends of the shower rods taken along line 10-10 of FIG. 9.

Referring to FIGS. 1-10, there is shown a mounting bracket for a shower rod in accordance with the present invention and generally indicated at 10. FIG. 1 shows a bathtub enclosure 12 having one side wall removed for the sake of clarity. Enclosure 12 includes a straight shower rod 14 extending between a first wall 16 and an opposed second wall (not shown). Shower rod 14 is disposed a distance above the center of a front wall 18 of a bathtub 20 and is generally parallel thereto. A first end 14a of straight rod 14 is secured by a standard ring bracket 22a to first wall 16. A second end 14b of rod 14 is secured by a second standard ring bracket 22b to the second wall. Ring brackets 22a, 22b are fixedly secured to the first and second walls by fasteners 23 (FIG. 10). Alternatively, ring brackets 22a, 22b may be secured to first and second walls by an adhesive or some other permanent securement method or may be secured by a semipermanent method such as by a compressive force supplied by spring disposed within rod 14.

In accordance with a specific feature of the present invention, mounting bracket 10 is configured to engage the existing installed shower rod 14. Furthermore, mounting bracket 10 provides a way for securing a curved shower rod 60 in enclosure 12 without having to disassemble and remove the existing straight shower rod 14. Existing rod 14 may then be employed for other purposes such as hanging towels 66 and other useful items. Curved rod 60 may take any one of a variety of configurations that includes an arcuate or curved section. Bracket 10 is capable of engaging a wide variety of different configurations of curved rod 60. Curved rod 60 may also be configured to telescope or otherwise adjust so that it can be expanded to fit into different size shower stalls. So, for instance, rod 60 may be able to be adjusted to have a length of between sixty inches and seventy two inches.

Mounting bracket 10 is a unitary one-piece component molded from a suitable material such as polyvinyl chloride. Bracket 10 comprises a body having a first member 24 and a second member 26 that are substantially coplanar. Preferably, both of first member 24 and second member 26 are substantially tubular in configuration. As will be further described herein, first member 24 is configured to engage a curved shower rod 60 and second member 26 is configured to engage a previously installed straight shower rod 14. Since first and second members 24, 26 are coplanar, curved shower rod 60 is retained by bracket 10 in such a manner that it is substantially coplanar with straight shower rod 14.

Figure 7:
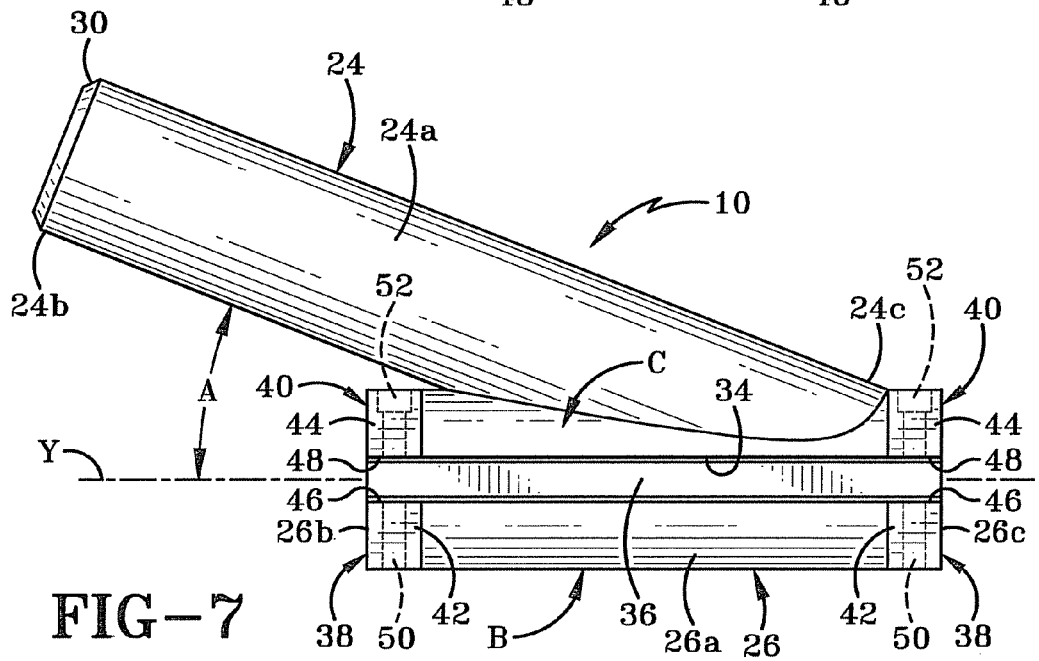
FIG. 7 is bottom view of the mounting bracket.

First member 24 includes a wall 24a that is substantially circular in cross-sectional shape and has a first end 24b and a second end 24c. Wall 24a defines a tubular first bore 28 therein that extends between the first and second regions 24b, 24c. As shown in FIG. 7, first end 24b of wall 24a includes a beveled edge 30. First member 24 is of a first diameter D1 (FIG. 5).

Second member 26 includes a wall 26a having a first end 26b and a second end 26c. Wall 26a defines a longitudinal bore 30 therein that extends from first end 26b to second end 26c. As shown in FIG. 10, second member 26 has a longitudinal axis "Y" that extends between first and second ends 26b, 26c. The longitudinal axis "Y" will be aligned with the longitudinal axis of the straight rod 14 when mounting bracket 10 is engaged therewith. In accordance with another feature of the present invention, second member 26 defines a longitudinally aligned slot 34 (FIG. 4) that extends between first and second ends 26b, 26c thereof. Slot 34 is in operational communication with second bore 32. Second member 26 further defines a living hinge 36 therein. Living hinge 36 is disposed opposite slot 34 and effectively divides second member 26 into a first side "B" and a second side "C" (FIG. 1). Preferably, living hinge 36 is formed by cutting a generally U-shaped rectangular notch into the interior wall of second member 26. The notch preferably has a width of around 0.25". Because of slot 34 and hinge 36, first side "B" of second member 26 is rotatable away from second side "C" thereof about hinge 36. This enables the user to increase the size of slot 34 between first and second sides "B", "C" and thus the size of second bore 32 therein. It will be understood that the notch of hinge 36 may be formed in a narrower V-shape rather than the wider U-shape without departing from the scope of the present invention. However, it has been found that the U-shaped notch gives greater flexibility to second member 26 when rotating first and second sides "B", "C" away from each other. Any other types of hinge may be utilized on second member 26 without departing from the scope of the present invention.

Figure 5:
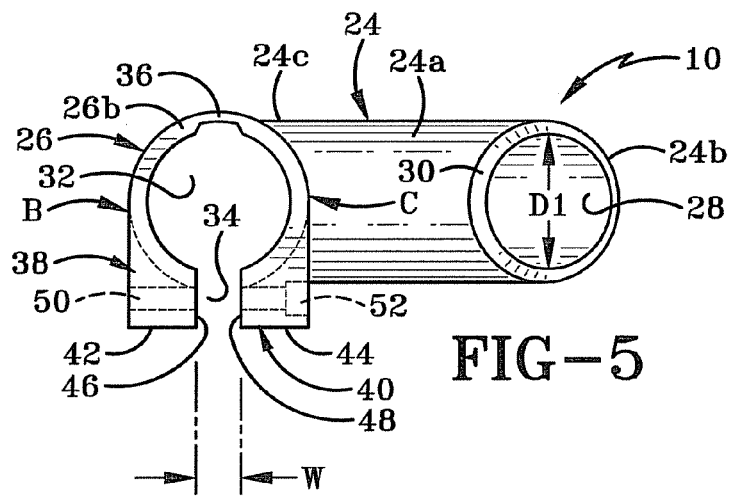
FIG. 5 is a front view of the mounting bracket.
Figure 6:
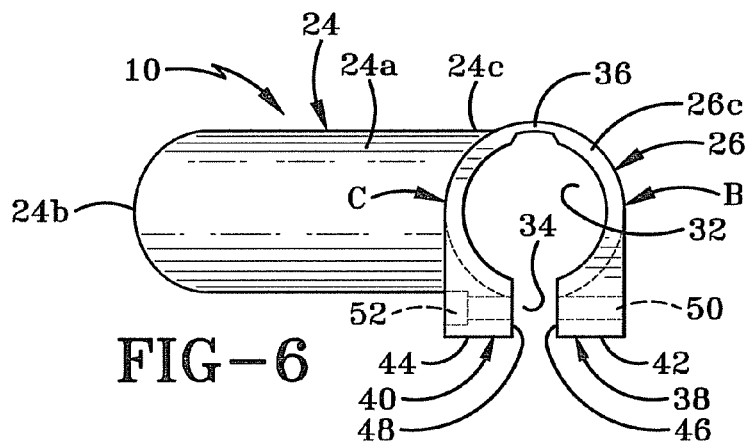
FIG. 6 is a rear view of the mounting bracket.

As shown in FIGS. 5 and 6, the wall 26a of second member is of a substantially uniform thickness except proximate first and second ends 26b, 26c. At each of first and second ends 26b, 26c, the wall is of an increased thickness in the regions disposed on either side of slot 34. The regions of increased thickness form a pair of opposing feet 38, 40, each of which includes a substantially planar bottom face 42, 44 (FIG. 3) and complementary inner faces 46, 48. Inner faces 46, 48 preferably are disposed at right angles to longitudinal axis "Y" and are positioned a distance "W" apart from each other when bracket 10 is not engaged with rod 14 and is in the at-rest position (FIGS. 5 & 6). In other words, slot 34 has a width "W" when mounting bracket 10 is in an at-rest position. It will be understood that while feet 38, 40 preferably are provided only at first and second ends 26b, 26c of second member 26, they may, alternatively, extend for substantially the entire length of second member 26 and be disposed on either side of slot 34.

Figure 4:
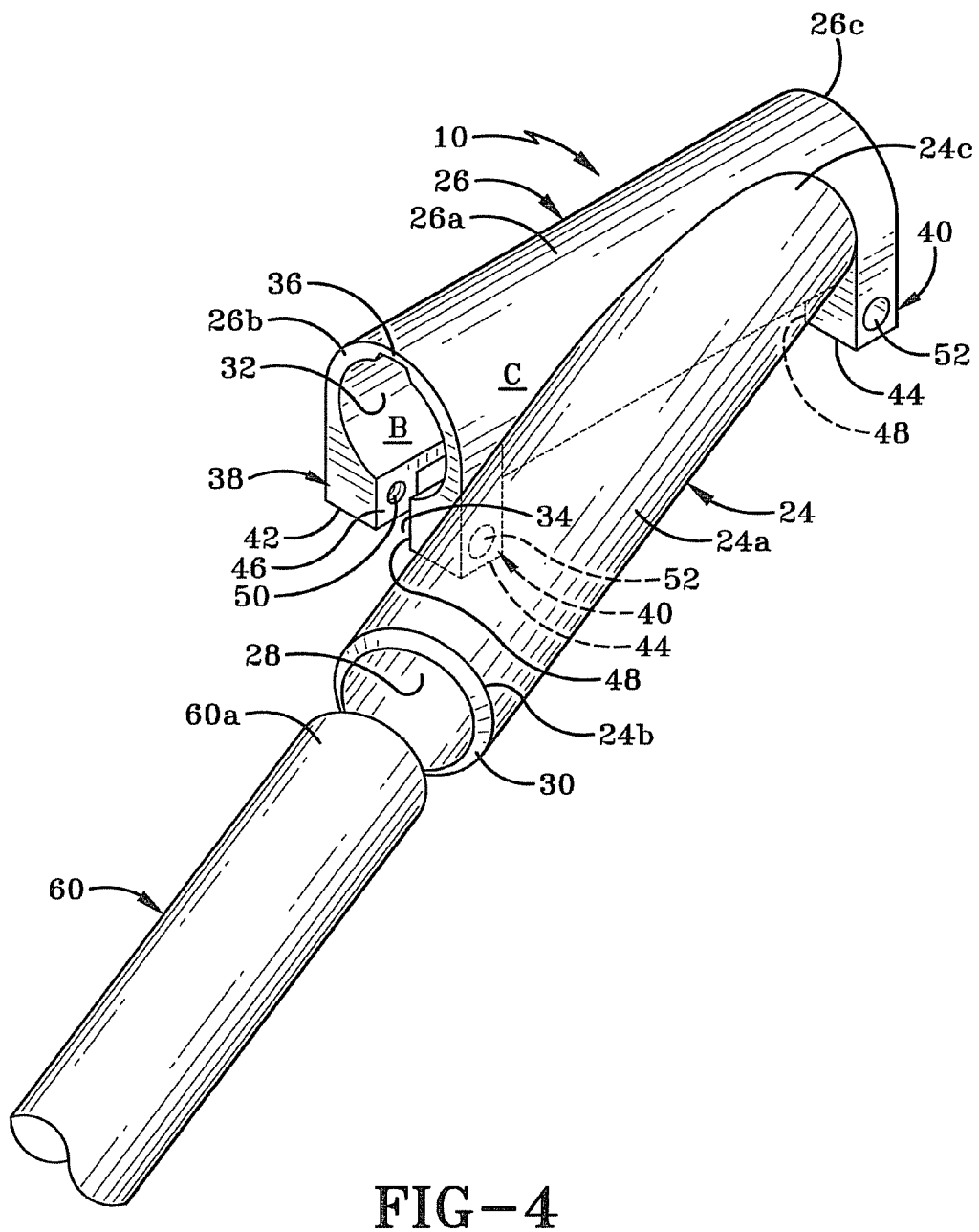
FIG. 4 is a perspective view of the mounting bracket with the curved rod separated therefrom.

Each foot 38 defines an aperture 50 (FIG. 4) and each foot 40 defines an aperture 52 (FIG. 4). Apertures 50, 52 are disposed at right angles to longitudinal axis "Y" and are aligned one with the other. FIG. 9 shows that each aperture 50 preferably is internally threaded.

In accordance with a specific feature of the present invention, first member 24 is disposed at an angle relative to second member 26. Angle A" (FIG. 10) is between 15° and 25° relative to the longitudinal axis "Y" and, preferably, angle "A" is 21.5° relative thereto. Bracket 10 is molded so that an aperture 56 is defined in the area where second end 24c of first member 24 intersects wall 26a of second member 26. In this instance, first bore 28 of first member 24 is in communication with second bore 32 of second member 26. It will be understood, however, that wall 26a may be substantially continuous between first and second ends 26b, 26c (apart from slot 34) and there is no communication between first bore 28 and second bore 32.

Referring to FIG. 7, it can be seen that first end 24b of first member 24 extends longitudinally outwardly for a distance beyond first end 26b of second member 26. Furthermore, second end 26c of second member 26 extends longitudinally outwardly for a distance beyond second end 24b of first member 24. Preferably, first member 24 is around six inches long and second member 26 is around two and a half inches long. It will be understood, however, that second member 26 could be longer than first member, without departing from the scope of the present invention.

Figure 3:
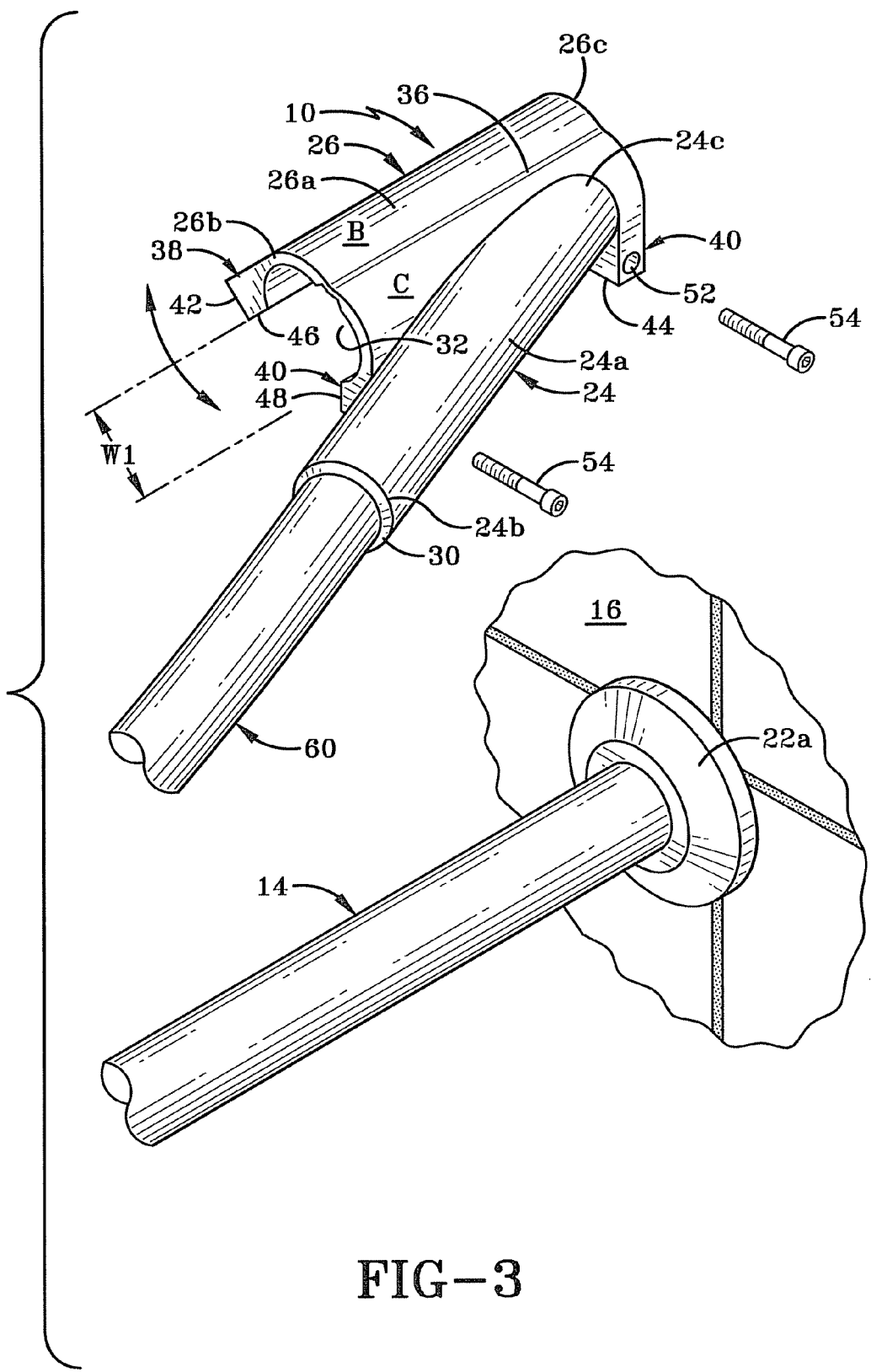
FIG. 3 is a perspective view of the mounting bracket exploded outwardly away from a straight shower rod while being engaged with an end portion of a curved shower rod.

Mounting bracket 10 is used in the following manner. As indicated previously, it should be understood that bracket 10 is designed to be engaged with a previously installed straight shower rod 14 that is mounted in bathtub enclosure 12 and is secured between first wall 16 and the opposing second wall. When the user wishes to install a curved shower rod 60, mounting bracket 10 is engaged with straight rod 14. This is accomplished by grasping first region "B" of bracket 10 and pulling it outwardly away from second region "C" thereof. This movement, illustrated by the arrow in FIG. 8 causes first region "B" to rotate away from second region "C" about living hinge 36. The movement causes the width of slot 34 to increase from width "W" (FIG. 5) to a width "W1" (FIG. 3). As is evident when comparing FIGS. 5 and 3, width "W1" is substantially larger than width "W".

Once slot 34 has expanded in width to a sufficient degree to allow straight shower rod 14 to pass therethrough, bracket 10 is moved toward rod 14 so that rod 14 enters second bore 32 thereof. It will be understood that the second bore 32 will have to be of a width that is at least as wide as the diameter of the straight rod 14 that is to be received therethrough. Once straight rod 14 has passed through slot 14, first region "B" is released. Width "W1" of slot 34 decreases once again to width "W" and a portion of straight rod 14 becomes encircled by and trapped between first and second regions "B", "C" as shown in FIG. 9. If mounting bracket 10 is not positioned adjacent one of the first and second ends 14a, 14b of rod 14, it may be slid along rod 14 until it is in the correct location. The one of the first and second ends 14a, 14b is therefore received in the second bore 32 of bracket 10. It should also be noted that bracket 10 may be rotated around the circumference of rod 14 to properly orient bracket 10. Preferably, bracket 10 is oriented so that slot 34 therein is adjacent a lowermost region of rod 14 that is opposed to the top of sidewall 18 of bathtub 20.

At this point, mounting bracket 10 is engaged with straight shower rod 14 but is not securely retained thereon. In order to securely retain mounting bracket 10 in place, a securement mechanism must be engaged. In the preferred embodiment of the invention, a fastener 54 is inserted into each pair of aligned apertures 50, 52 in both pairs of feet 38, 40 at each end of second member 26. Fasteners 54 are rotated so that threads on the exterior surface thereof become threadably engaged with the threads in aperture 50. Fasteners 54 are engaged with second member 26 to prevent slot 34 from expanding after the portion of the straight shower rod 14 is captured within the second bore 32. When fastener 54 is so engaged, mounting bracket 10 is fixedly secured to rod 14 and is not removable therefrom unless the securement mechanism is disengaged, i.e., unless fastener 54 is unscrewed. It will be understood that other types of securement mechanisms can be utilized on mounting bracket 10 without departing from the scope of the present invention. For instance, some type of clamping mechanism can be used to bring first region "B" toward second region "C". It should be noted that faces 46, 48 do not have to contact each other when mounting bracket 10 is engaged on straight rod 14. It is only necessary that first and second regions "B", "C" be brought close enough to each other to narrow slot 34 to a point that it is smaller than the diameter of rod 14.

Curved rod 60 may be engaged with bracket 10 prior to bracket 10 being engaged on rod 14 or after bracket 10 has been engaged therewith. FIG. 4 shows an end 60a of curved rod 60 being inserted into first bore 28 of first member 24. Thus, end 60a of rod 60 is received in the first bore 28 of bracket 10. End 60a is slid inwardly for a distance of around three inches so that rod 60 has sufficient purchase in bracket 10. The curvature of typical curved rods starts approximately four inches from either end. Thus, the end 60a of curved rod 60 that is engaged with bracket 10 is substantially straight and is not curved.

Once rod 60 has been engaged with bracket 10 and bracket 10 has been engaged with rod 14, a second bracket 10b (FIG. 1) is engaged with the second end 14b of rod 14 in the same manner as has been described above. It should be noted, however, that a second end 60b of curved rod 60 preferably is engaged with the second bracket 10b prior to that bracket being engaged with second end 14b of rod 14. Additionally, it should be noted that brackets 10a and 10b are engaged on straight shower rod 14 in such a manner that they are mirror images of each other. It should also be noted that the first members 24 thereof extend outwardly away from the interior of enclosure 12 to ensure that the curvature of curved rod 60 is such that it extends outwardly beyond the front wall 18 of bathtub 20. Additionally, because first and second members 24, 26 are coplanar, straight shower rod 14 and curved rod 60 are retained in coplanar relationship with each other. It should be understood, however, that bracket 10 may be otherwise designed so that straight shower rod 14 and curved shower rod 60 may be held in offset relationship with each other, i.e., that may be held a spaced distance vertically away from each other by vertically offsetting the first and second members 24, 26 relative to each other on the body of bracket 10.

Once both brackets 10, 10b have been secured to the first and second ends 14a, 14b of rod 14, then a shower curtain 62 can be suspended from rod 60 by a plurality of rings 64 or hooks (not shown). Straight rod 14 can be used in any manner desired by user, but a suitable use for rod 14 is as a place to hang towels 66 and items such as shower caddies (not shown) thereon.

Should the user desire to ensure that mounting bracket 10 not be able to slide longitudinally along straight rod 14, or rotated circumferentially about the same, an adhesive strip or other type of movement retarding mechanism is engaged with bracket 10 prior to installation of the same. This is shown in FIG. 8 where an adhesive strip 57 is applied to first region "B".

It should be noted that while it is disclosed that first and second regions "B", "C" of second member 26 are molded as a unitary piece and are secured together along a living hinge 36, it will be understood that the two sections "B", "C" may, alternatively be separate components that are joined together by a separate hinge.

One of the advantages of bracket 10 is that it can be used to install a curved shower rod 60 without removing the previously installed straight shower rod 14 and thereby running the risk of damaging the first wall 16 and second wall of the enclosure 12. Another advantage of bracket 10 is that it is not fixedly secured to straight rod 14 itself. If it is later decided to remove curved rod 60, straight rod 14 has not been damaged by the installation of curved rod 14 such as by drilling screws into the same. Additionally, the installation of bracket and later removal thereof, if desired, is quick and easy and is accomplished with the use of a single screwdriver.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of the invention are an example and the invention is not limited to the exact details shown or described.

The invention claimed is:

1. A bracket for mounting a curved shower rod onto a straight shower rod, which straight shower rod is installed between two walls of a shower stall using another separate pair of mounting brackets, said bracket comprising:
    a body including:
        a first member;
        a first bore defined in the first member and adapted to receive an end of the curved shower rod therein;
        a second member; and
        a second bore defined in the second member and adapted to engage the straight shower rod; and wherein the second member is adjustable so as to change a diameter of the second bore in order to receive the straight shower rod therein.

2. The mounting bracket as defined in claim 1, wherein the first member extends outwardly adjacent the second member.

3. The mounting bracket as defined in claim 2, wherein the second member has a first end and a second end and a longitudinal axis extending between the first and second ends and disposed at right angles relative to the first end; and wherein the first member extends outwardly from the second member and at an angle relative to the longitudinal axis thereof.

4. The mounting bracket as defined in claim 3, wherein the angle is between 15 and 25 degrees.

5. The mounting bracket as defined in claim 4, wherein the angle is 21.5 degrees.

6. The mounting bracket as defined in claim 3, wherein the first and second members are coplanar.

7. The mounting bracket as defined in claim 1, wherein the second member includes:
    a wall having a first end, a second end and a longitudinal axis extending between the first and second ends thereof and at right angles relative to the first end, and wherein said second bore is bounded and defined by said wall;
    a slot defined in the wall and extending between the first and second ends of the wall; said slot being in communication with the second bore and having a width disposed at right angles to the longitudinal axis; and wherein the width of the slot is expanded when the second member is adjusted and the slot is therefore able to receive a portion of the straight shower rod therethrough.

8. The mounting bracket as defined in claim 1, wherein the wall of the second member further includes:
    a hinge which extends between the first and second ends of the wall and is disposed opposite the slot; and wherein a first section of the wall is disposed between the slot and a first side of the hinge, and a second section of the wall is disposed opposite the first section and between the slot and a second side of the hinge, and wherein the hinge permits the first section of the wall to move relative to the second section of the wall, so as to increase a width of the slot.

9. The mounting bracket as defined in claim 8, wherein the first section of the second member is rotatable in a first direction relative to the second section to increase the width of the slot, and the first section is rotatable in a second direction relative to the second section to decrease the width of the slot.

10. The mounting bracket as defined in claim 8, further comprising a securing mechanism for securing the straight shower rod within the second bore of the second member.

11. The mounting bracket as defined in claim 10, wherein the second member further includes:
   a first foot provided on the wall of the second member and disposed on a first side of the slot; and a first face provided on the first foot adjacent the slot; and
   a second foot provided on the wall of the second member and disposed on a second side of the slot; and a second face provided on said second foot adjacent the slot.

12. The mounting bracket as defined in claim 11, further comprising a fastener extending between the first and second feet.

13. The mounting bracket as defined in claim 12, further comprising:
   a first aperture defined in the first face; and
   a second aperture defined in the second face, said first and second apertures being aligned and sized to receive the fastener therethrough.

14. The mounting bracket as defined in claim 13, wherein the first foot and second foot are disposed at the first end of the second member; and the mounting bracket further includes:
   a third foot provided on the wall of second member adjacent the second end thereof, said third foot being disposed on the first side of the slot; a first face provided on said third foot adjacent the slot;
   a fourth foot provided on the wall of the second member disposed on the second side of the slot; a second face provided on said fourth foot adjacent the slot;
   a first aperture defined in the first face of the third foot;
   a second aperture defined in the second face of the fourth foot, and wherein the first and second apertures are aligned; and
   a second fastener that is receivable through the aligned first and second apertures of the third and fourth feet.

15. The mounting bracket as defined in claim 2, wherein the first member has a first end and a second end and the first bore originates proximate the second end thereof and extends inwardly toward the first end thereof; and wherein the first end of the first member connects to the second member at a position disposed between a first and a second end of the second member.

16. The mounting bracket as defined in claim 1, further including a retarding mechanism provided within the second bore of the second member to resist one or both of longitudinal and rotational motion of the mounting bracket on the straight shower rod.

\* \* \* \* \*